US011162414B2

(12) United States Patent
Barnes et al.

(10) Patent No.: US 11,162,414 B2
(45) Date of Patent: Nov. 2, 2021

(54) ENHANCED IDLER SHAFT INTERFACE FOR IMPROVING STRUCTURAL INTEGRITY OF FLYWHEEL HOUSING

(71) Applicant: Cummins Inc., Columbus, IN (US)

(72) Inventors: David M. Barnes, Columbus, IN (US); Kevin C. Augustin, Sr., Greenwood, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 16/961,588

(22) PCT Filed: Jan. 12, 2018

(86) PCT No.: PCT/US2018/013506
§ 371 (c)(1),
(2) Date: Jul. 10, 2020

(87) PCT Pub. No.: WO2019/139611
PCT Pub. Date: Jul. 18, 2019

(65) Prior Publication Data
US 2021/0062712 A1    Mar. 4, 2021

(51) Int. Cl.
*F02B 67/04*    (2006.01)
*F01M 11/00*    (2006.01)
(Continued)

(52) U.S. Cl.
CPC ......... *F02B 67/04* (2013.01); *F01M 11/0004* (2013.01); *F01M 11/02* (2013.01);
(Continued)

(58) Field of Classification Search
CPC ..... F02B 67/04; F01M 11/0004; F01M 11/02; F01M 13/00; F02F 11/00; F16C 3/02
See application file for complete search history.

(56) References Cited

U.S. PATENT DOCUMENTS 3,415,137 A    12/1968   Casale
3,502,059 A *   3/1970   Davis .................... F16H 57/023
                                                                                123/90.15
(Continued)

FOREIGN PATENT DOCUMENTS

JP      2017075556 A     4/2017
WO    2017169701 A1   10/2017

OTHER PUBLICATIONS

International Preliminary Reporton Patentability received for PCT Patent Application No. PCT/US2018/013506, dated Jul. 23, 2020, 06 pages.
(Continued)

*Primary Examiner* — Syed O Hasan
(74) *Attorney, Agent, or Firm* — Faegre Drinker Biddle & Reath LLP

(57) ABSTRACT

An idler shaft (100) used in an engine (10) having a gear cover (16) and a cylinder block (18). The idler shaft (100) includes an integral body (114) having a cylindrical shape. The idler shaft (100) is compressed between the gear cover (16) and the cylinder block (18) when assembled together such that the integral body (114) of the idler shaft (100) provides a clamp load and axial sealing between the gear cover (16) and the cylinder block (18). The idler shaft (100) further includes a passage way (116) fluidly connected to at least one of: the cylinder block (18) and the gear cover (16) for accommodating transmission of a fluid for the engine (10).

18 Claims, 6 Drawing Sheets

(51) Int. Cl.
*F01M 11/02* (2006.01)
*F01M 13/00* (2006.01)
*F02F 11/00* (2006.01)
*F16C 3/02* (2006.01)

(52) U.S. Cl.
CPC ............ *F01M 13/00* (2013.01); *F02F 11/00* (2013.01); *F16C 3/02* (2013.01)

(56) References Cited

U.S. PATENT DOCUMENTS

| | | |
|---|---|---|
| 4,885,953 A | 12/1989 | Sweetland et al. |
| 4,944,263 A | 7/1990 | Nagano et al. |
| 5,524,508 A | 6/1996 | Peters |
| 5,966,998 A | 10/1999 | Hara et al. |
| 6,415,758 B1 | 7/2002 | Pierro et al. |
| 7,617,811 B2 | 11/2009 | Neu et al. |
| 8,677,973 B2* | 3/2014 | Petry-Johnson ........ F16C 33/74 |
| | | 123/196 R |
| 2012/0285414 A1 | 11/2012 | Petry-Johnson et al. |
| 2018/0080352 A1* | 3/2018 | Patel ....................... F16H 57/04 |

OTHER PUBLICATIONS

International Search Report and Written Opinion issued by the ISA/US, Commissioner for Patents, dated Mar. 9, 2018, for International Application No. PCT/US2018/013506; 6 pages.

* cited by examiner

ENHANCED IDLER SHAFT INTERFACE FOR IMPROVING STRUCTURAL INTEGRITY OF FLYWHEEL HOUSING

CROSS-REFERENCE TO RELATED APPLICATIONS

The present application is a national phase filing of PCT/US2018/013506, filed Jan. 12, 2018, the complete disclosure of which is expressly incorporated by reference herein.

FIELD OF THE DISCLOSURE

The present disclosure generally relates to idler shafts used in engine gear trains and more particularly relates to an idler shaft that improves structural integrity on the engine gear trains.

BACKGROUND OF THE DISCLOSURE

Referring now to FIG. 1, an engine gear train, generally designated 10, includes a mechanical system having one or more gears 12, 13 configured to transfer mechanical power from a rotatable crankshaft 14 to accessories or components elsewhere within engine 10. Typically, flywheel and associated gears 12, 13 are enclosed by a gear cover 16 attached to a cylinder block 18 of engine 10. During operation, rotation of crankshaft 14 drives the one or more gears 12, 13 disposed between gear cover 16 and cylinder block 18 to transmit the mechanical power to other components of engine 10. A certain gear 12 can be supported by a conventional stationary idler shaft 20 and bearing assemblies (not shown), including appropriate lubricating systems. In engine gear train 10, conventional idler shaft 20 is fastened to cylinder block 18 using one or more fasteners 22 to support gear 12. However, conventional idler shaft 20 has many drawbacks.

In use, angular velocity fluctuations of crankshaft 14 in engine 10 can cause unwanted movement (e.g., vibrations) on idler shaft 20 disposed between gear cover 16 and cylinder block 18. In FIG. 1, idler shaft 20 is fastened only to cylinder block 18. A certain degree of stiffness or rigidity is desired in a drive line of engine 10 including idler shaft 20 to achieve vibration isolation with an acceptable drive line motion control. However, after experiencing the unwanted movement over a time period, the rigidity of idler shaft 20 during the power transfer from crankshaft 14 to flywheel can be compromised due to displacement of idler shaft 20, and thus a drive line in engine 10 can also become misaligned causing additional harm to engine 10. As such, conventional idler shaft 20 is less desirable under a vibration harshness condition.

Further, in some cases, a compound idler gear (CIG) shaft (not shown) is used to accommodate an axially taller gear 12 (e.g., a compound gear). For example, axially taller gear 12 can have two or more gears that are coaxially fixed together to operate other adjacent gears in motion. CIG shaft refers to two or more idler shafts 20 that are fixedly attached together to support taller gear 12. However, during the vibration harshness condition, the attached conventional idler shafts can become loose or pushed outwardly in a radial direction causing further unwanted vibrations and radial movement. Such movement can cause not only unwanted noise but also premature bearing/gear teeth wear and drive line misalignment.

Moreover, a blow-by gas can be emitted in engine 10, as a result of leaks of intake air-fuel mixture and combustion gases through clearances around piston rings, during compression, combustion and/or exhaust cycles. Because of these blow-by gases, a crankcase pressure will inherently rise, promoting leakage of oil, gas, or water from engine 10. As an example, a breather 24 connected to a vent (not shown) is operatively and fluidly coupled to engine 10 to relieve the crankcase pressure by venting out the blow-by gas into the atmosphere, and to drain or supply a mixture of oil, gas, and/or water from engine 10. Conventional idler shaft 20 provides no passage features associated with breather 24. For example, during a cold engine-start condition, such venting, supply, and drainage operations can be compromised because drain, supply, and vent passage ways can be readily obstructed by ice or other frozen substances. Accordingly, there exists a need for an enhanced idler shaft that remedies one or more drawbacks described above.

SUMMARY

According to one embodiment, the present disclosure provides an idler shaft used in an engine having a gear cover and a cylinder block. The idler shaft includes a first side engaging an inner surface of the gear cover, and an opposite second side engaging an outer surface of the cylinder block, such that both the gear cover and the cylinder block are connected together by the idler shaft during operation of the engine.

In one example, the idler shaft is sandwiched between the gear cover and the cylinder block when assembled together. In another example, the idler shaft is gaplessly disposed between the gear cover and the cylinder block during use of the engine. In yet another example, the idler shaft is fastened to the gear cover and the cylinder block using at least one fastener. In a variation, the idler shaft includes at least one throughbore configured to accommodate insertion of the at least one fastener. In a further variation, the at least one fastener simultaneously holds the cylinder block, the idler shaft, and the gear cover together.

According to another embodiment, the present disclosure provides an idler shaft used in an engine having a gear cover and a cylinder block. The idler shaft includes an integral body having an axial length greater than a total thickness of at least one gear supported by the idler shaft, the idler shaft being compressed between the gear cover and the cylinder block when assembled together such that the integral body of the idler shaft provides a clamp load and axial sealing between the gear cover and the cylinder block.

In one example, an axial length of the idler shaft is greater than eighty percent of a diameter of the idler shaft. In another example, the integral body of the idler shaft supports a compound gear. In yet another example, the integral body of the idler shaft has a cylindrical shape configured to be inserted into an opening of the at least one gear.

According to yet another embodiment, the present disclosure provides an idler shaft used in an engine having a gear cover and a cylinder block. The idler shaft includes a passage way fluidly connected to at least one of: the cylinder block and the gear cover for accommodating transmission of a fluid for the engine and a delivery of the fluid to the idler shaft.

In one example, the passage way of the idler shaft is fluidly connected to at least one of: a cylinder block passage way embedded in the cylinder block and a gear cover passage way embedded in the gear cover. In another example, the passage way of the idler shaft is fluidly connected to a breather associated with the engine. In yet another example, the passage way of the idler shaft is configured to prevent back flow of the fluid delivered to the idler shaft. In a variation, the passage way includes a first passage way connected to the cylinder block. In a further variation, the passage way includes a second passage way connected to the first passage way at one end, and at an opposite end, connected to the gear cover. In another variation, the first passage way is disposed higher than an uppermost portion of the second passage way. In yet another variation, the passage way of the idler shaft is fluidly connected to a common fluid sump associated with the engine.

According to still another embodiment, the present disclosure provides an idler shaft used in an engine having a gear cover and a cylinder block. The idler shaft includes an integral body having a cylindrical shape, the idler shaft being compressed between the gear cover and the cylinder block when assembled together such that the integral body of the idler shaft provides a clamp load and axial sealing between the gear cover and the cylinder block, and a passage way fluidly connected to at least one of: the cylinder block and the gear cover for accommodating transmission of a fluid for the engine.

In one example, the idler shaft includes a first side engaging an inner surface of the gear cover; and an opposite second side engaging an outer surface of the cylinder block, such that both the gear cover and the cylinder block are connected together by the idler shaft during operation of the engine.

While multiple embodiments are disclosed, still other embodiments of the present disclosure will become apparent to those skilled in the art from the following detailed description, which shows and describes illustrative embodiments of the present disclosure. Accordingly, the drawings and detailed description are to be regarded as illustrative in nature and not restrictive.

BRIEF DESCRIPTION OF THE DRAWINGS

The above-mentioned and other features of this disclosure and the manner of obtaining them will become more apparent and the disclosure itself will be better understood by reference to the following description of embodiments of the present disclosure taken in conjunction with the accompanying drawings, wherein.

Figure 1:
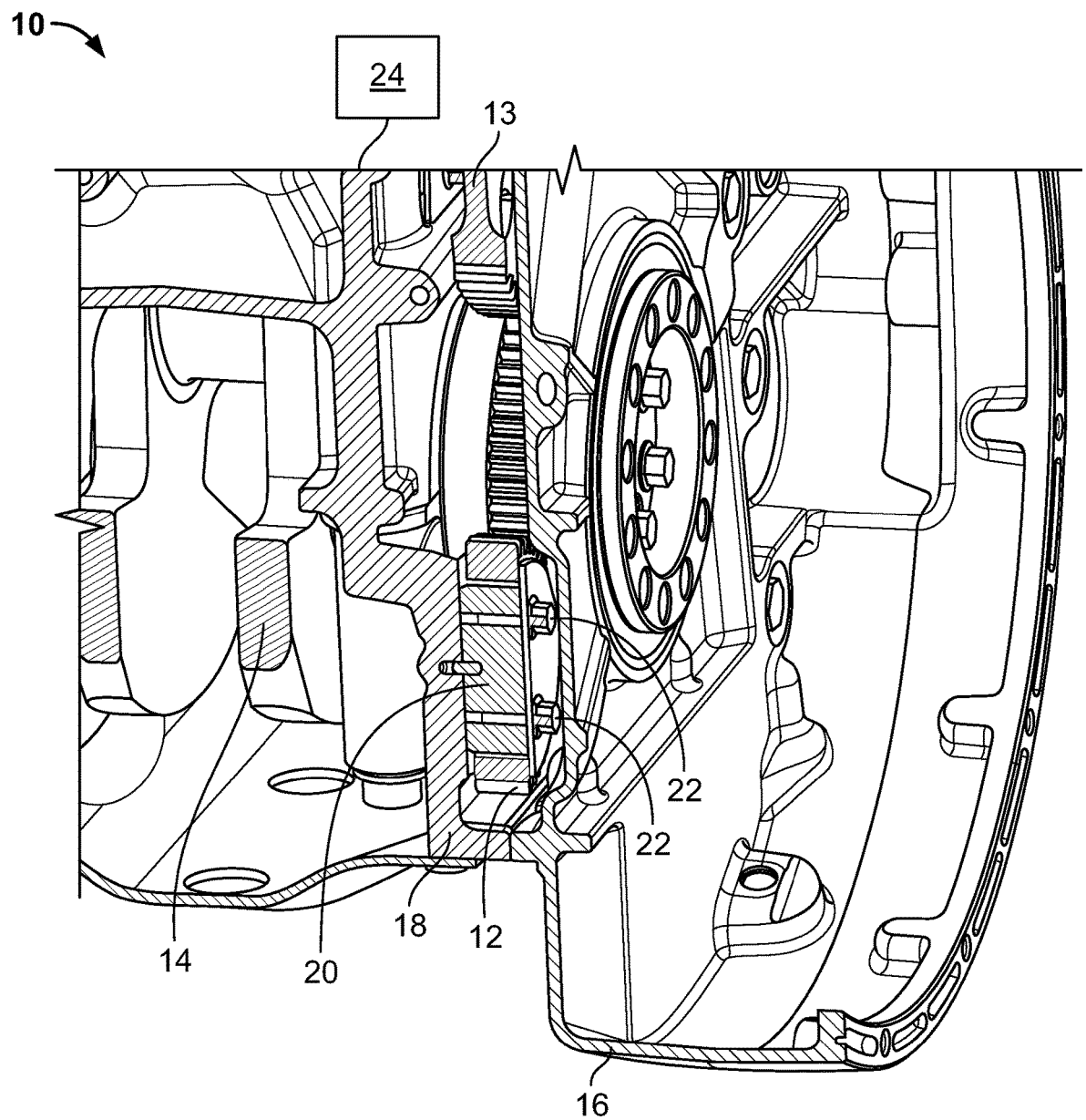
FIG. 1 is a perspective partial cross-sectional view of an engine gear train featuring a conventional idler shaft.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplification set out herein illustrates embodiments of the disclosure, and such exemplifications are not to be construed as limiting the scope of the disclosure in any manner.

DETAILED DESCRIPTION

For the purposes of promoting an understanding of the principles of the disclosure, reference will now be made to the embodiments illustrated in the drawings, which are described below. It will nevertheless be understood that no limitation of the scope of the disclosure is thereby intended. The disclosure includes any alterations and further modifications in the illustrated device and described method and further applications of the principles of the disclosure, which would normally occur to one skilled in the art to which the disclosure relates. Moreover, the embodiments were selected for description to enable one of ordinary skill in the art to practice the disclosure.

Figure 2:
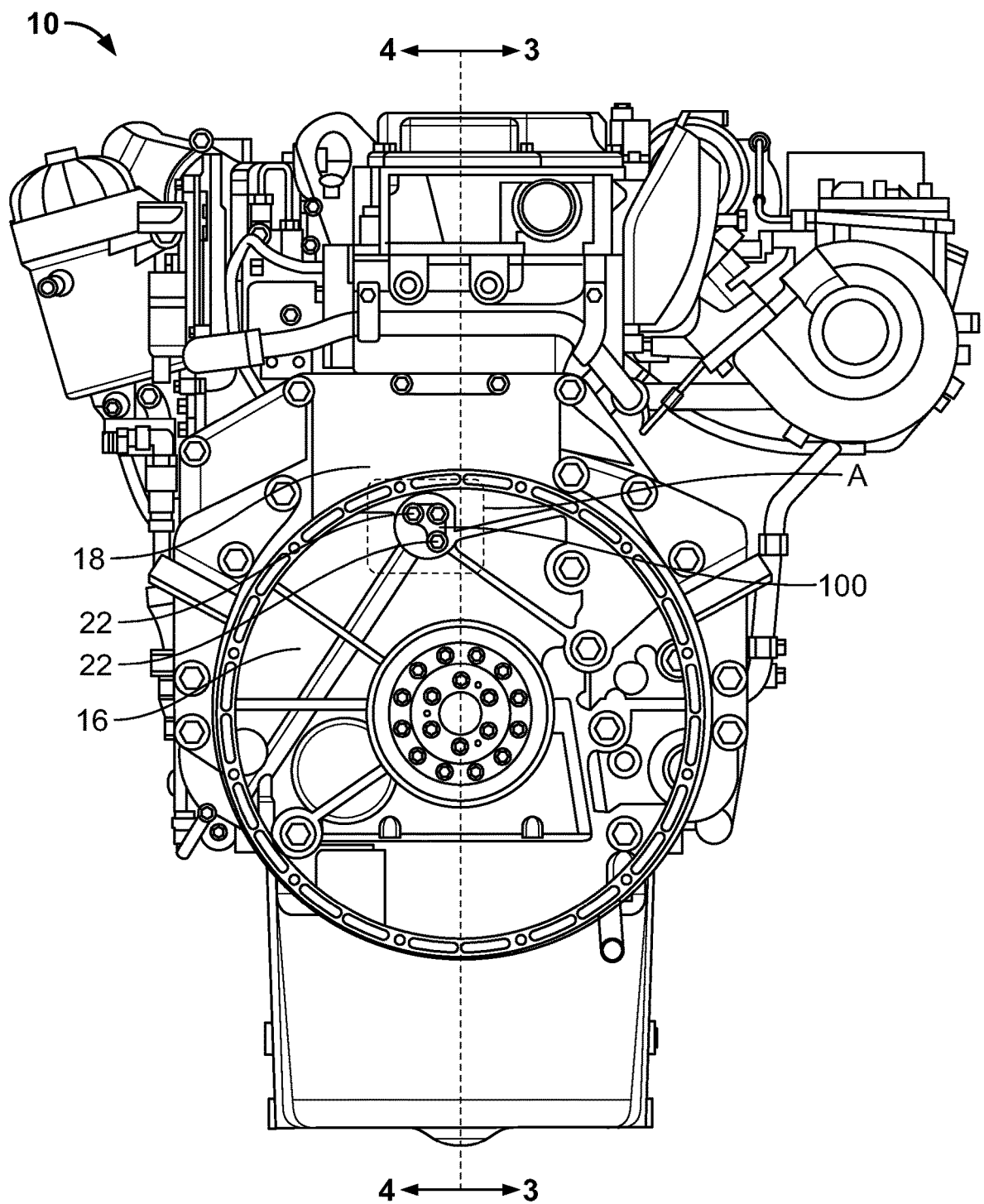
FIG. 2 is a front view of the engine gear train of FIG. 1 featuring an enhanced idler shaft disposed between a gear cover and a cylinder block in accordance with an embodiment of the present disclosure.
Figure 3:
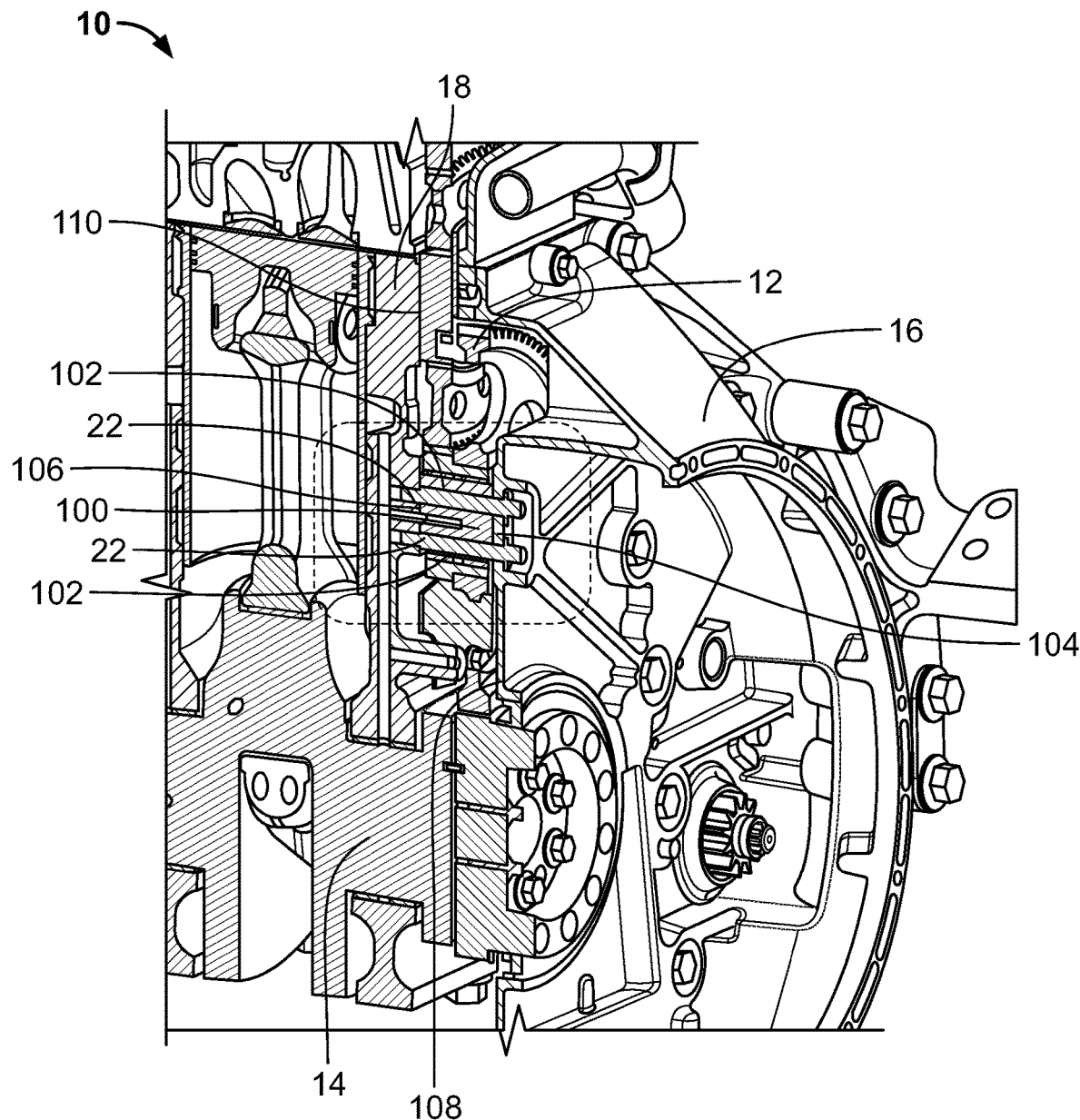
FIG. 3 is an enlarged partial cross-sectional view of a portion A of the engine gear train taken along the line 3-3 of FIG. 2 in accordance with an embodiment of the present disclosure.

Referring now to FIGS. 2 and 3, engine gear train 10 having an enhanced idler shaft 100 ("EI shaft" hereinafter) according to one embodiment of the present disclosure is depicted. Like components have been given the same reference designations. In FIGS. 2 and 3, crankshaft 14 (partially shown with counterweights and webs) is coupled to an engine flywheel (not shown). Of course, one of ordinary skill in the art could configure engine 10 for mechanical coupling to a variety of different engine locations. As an example only, a direct mechanical coupling can eliminate the need to use a motor to start rotation of crankshaft 14 upon engine start up, which reduces a number of components added to engine 10, and the associated cost and space requirements. It is contemplated that power can be transferred to flywheel, resulting in some overall vehicle energy recovery by increasing a work output of engine 10.

As shown in FIGS. 2 and 3, engine 10 includes EI shaft 100 gaplessly disposed between gear cover 16 and cylinder block 18 in lieu of conventional idler shaft 20. Notably, instead of fastening conventional idler shaft 20 only to cylinder block 18, EI shaft 100 is fastened to both gear cover 16 and cylinder block 18 using one or more fasteners 22. In this configuration, EI shaft 100 provides a secure and simultaneous clamp load holding gear cover 16, EI shaft 100, and cylinder block 18 together, integrating the functionality of a structural gear cover and flywheel housing. This enhances an overall engine and transmission powertrain stiffness and maximizes a structural integrity of engine 10. In the illustrated embodiment of FIG. 3, EI shaft 100 has one or more throughbores 102 configured to accommodate insertion of corresponding fasteners 22 wherein each of fasteners 22 simultaneously holds gear cover 16, EI shaft 100, and cylinder block 18 together.

More specifically, EI shaft 100 has a first side 104 and an opposite second side 106. When assembled, first side 104 of EI shaft 100 directly engages an inner surface 108 of gear cover 16 and opposite second side 106 of EI shaft 100 directly engages an outer surface 110 of cylinder block 18 for facilitating the clamp load supporting both cylinder block 18 and gear cover 16. In this configuration, inner surface 108 of gear cover 16 and outer surface 110 of cylinder block 18 are disposed in substantially parallel spaced relationship such that EI shaft 100 can be firmly sandwiched between gear cover 16 and cylinder block 18 when fastened by fasteners 22 (see also FIG. 5). As a result, EI shaft 100 is compressed between gear cover 16 and cylinder block 18 when assembled together, and thus such direct engagement of EI shaft 100 against gear cover 16 and cylinder block 18 provides a tight seal around first side 104 and second side 106 of EI shaft 100 during use.

Figure 4:
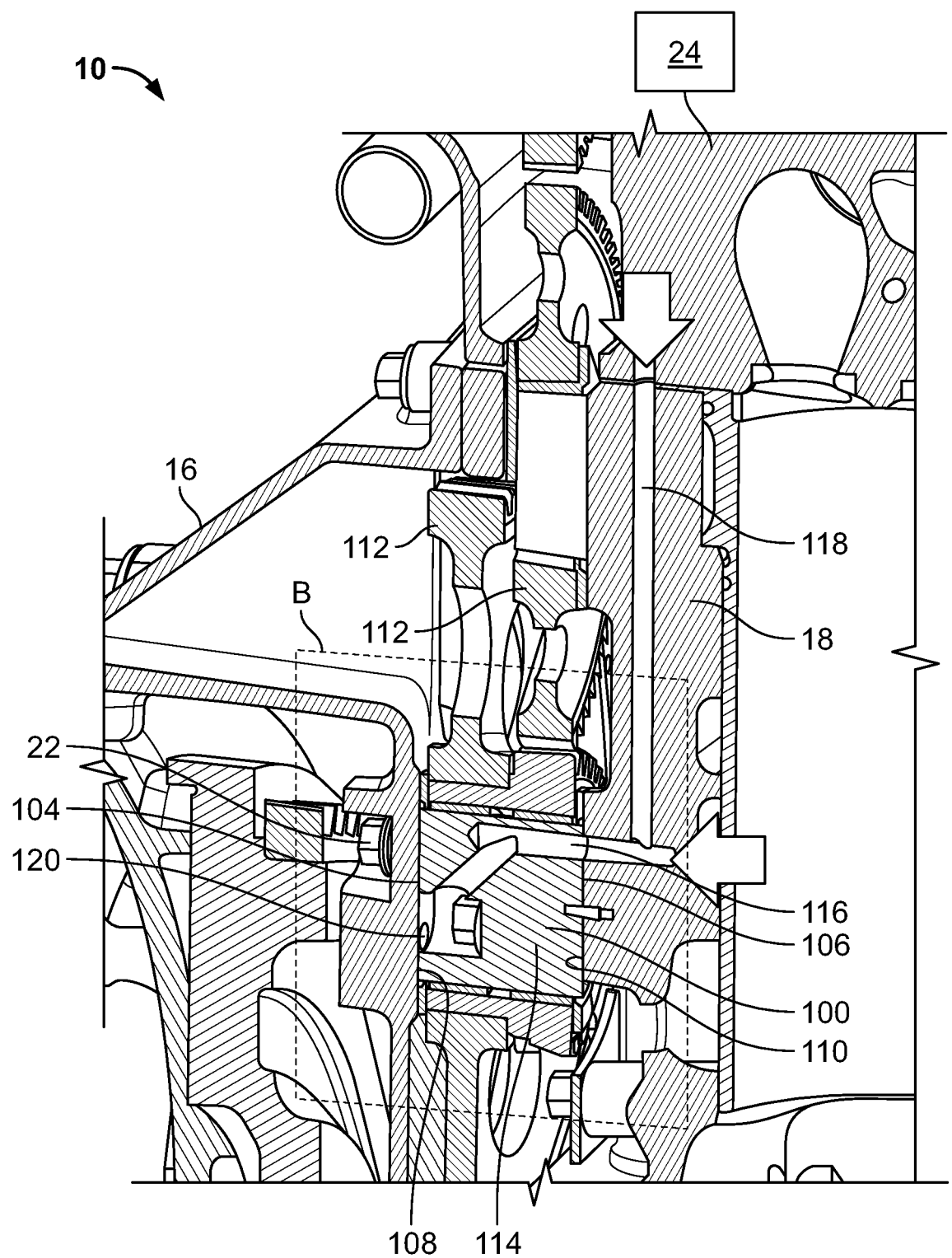
FIG. 4 is an enlarged partial cross-sectional view of a portion A of the engine gear train taken along the line 4-4 of FIG. 2 in accordance with an embodiment of the present disclosure.
Figure 5:
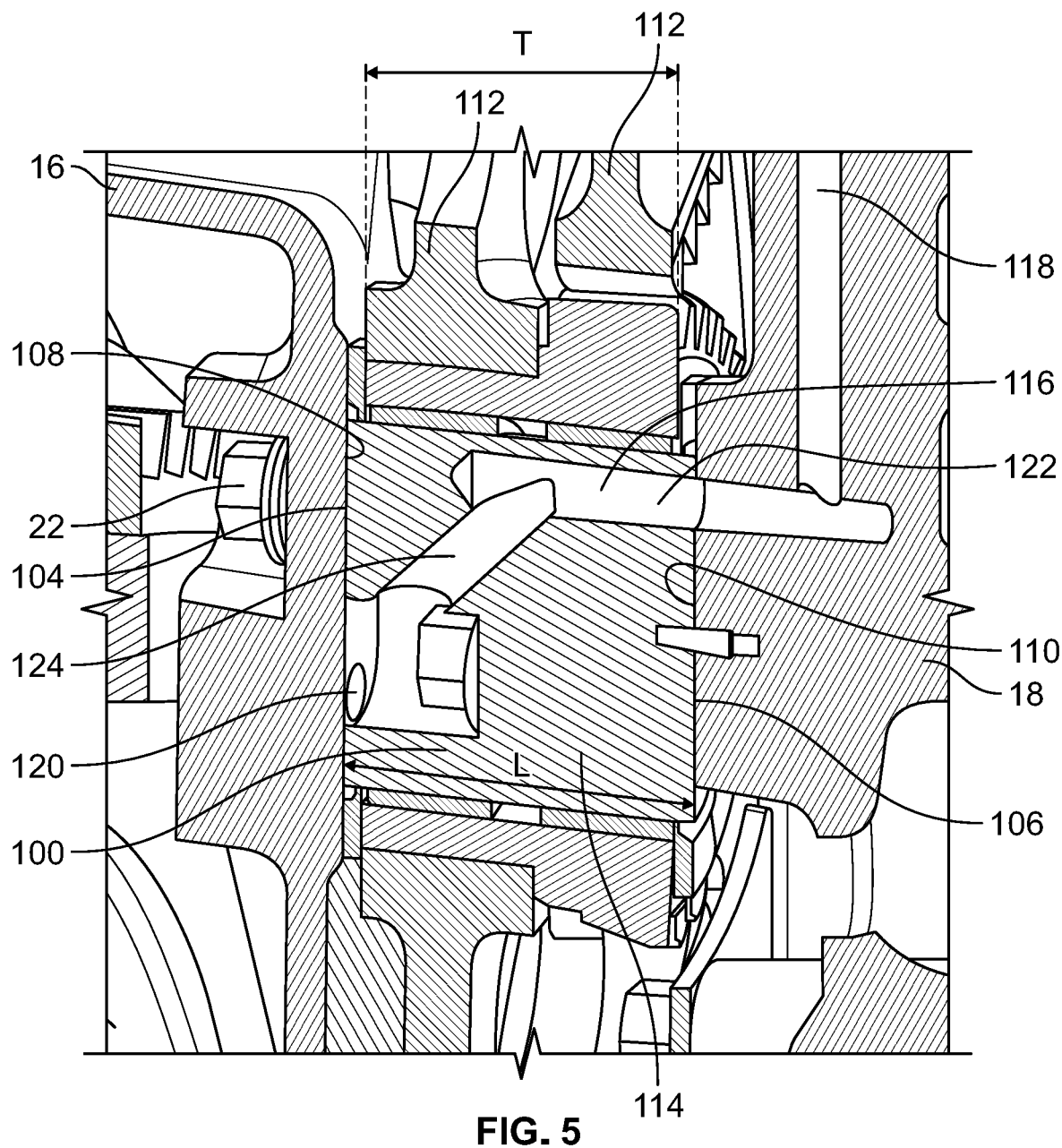
FIG. 5 is an enlarged partial cross-sectional view of a portion B of the engine gear train of FIG. 4 in accordance with an embodiment of the present disclosure.

Referring now to FIGS. 4 and 5, when a compound gear 112 is used, instead of attaching two or more conventional idler shafts 20 together, EI shaft 100 has an integral body 114 having an axial length L greater than a total thickness T of compound gear 112. Integral body 114 of EI shaft 100 has a cylindrical shape to be inserted into an opening of compound gear 112. Similarly, the cylindrical shape of integral body 114 can be inserted into an opening of gear 12, as shown in FIG. 3, for supporting gear 12 during use. Further, the axial length L of integral body 114 of EI shaft 100 defines a distance between gear cover 16 and cylinder block 18 such that EI shaft 100 is tightly sandwiched between gear cover 16 and cylinder block 18 when assembled together. It is advantageous that even when EI shaft 100 having a long axial length (e.g., greater than 80 percent of a diameter of idler shaft) is used, this configuration of EI shaft 100 provides a stable clamp load and secure axial sealing between gear cover 16 and cylinder block 18.

Moreover, EI shaft 100 includes a passage way 116 fluidly connected to at least one of: a cylinder block passage way 118 of cylinder block 18 and a gear cover passage way 120 of gear cover 16. In the illustrated embodiment, passage way 116 of EI shaft 100 is fluidly connected to both cylinder block passage way 118 embedded in cylinder block 18 and gear cover passage way 120 embedded in gear cover 16 for accommodating transmission of a fluid or media (e.g., the mixture of oil, gas, coolant and/or water) for engine 10 and a delivery or supply of the fluid to EI shaft 100. For example, the transmission of the fluid can refer to drainage, supply, or delivery operation of the fluid to or from engine 10. Further, the fluid or media can include liquid, gaseous, or solid substances suitable for transmission. In one example, cylinder block passage way 118 can be operatively and fluidly connected to breather 24 for facilitating a delivery of the fluid from breather 24 (or other components of engine 10) to EI shaft 100. Passage way 116 of EI shaft 100 receives the fluid via cylinder block passage way 118 and delivers the fluid to gear cover 16 via gear cover passage way 120.

In FIG. 5, EI shaft 100 includes passage way 116 designed to prevent back flow of the fluid delivered to EI shaft 100. In the illustrated embodiment, passage way 116 includes an optional substantially horizontal passage way 122 connected to cylinder block passage way 118, and a substantially non-horizontal (e.g., vertical or diagonal) passage way 124 connected to horizontal passage way 122 at one end, and at an opposite end, connected to gear cover passage way 120. In one example, horizontal passage way 122 is disposed higher than an uppermost portion of non-horizontal passage way 124. As such, the fluid travels from cylinder block passage way 118 to gear cover passage way 120 under the action of gravity, thereby providing a one-way flow of the fluid. However, other suitable orientations of the passage ways 122 and 124 are also contemplated to suit different applications.

Alternatively, passage way 116 can include non-horizontal passage way 124 only (i.e., without horizontal passage way 122) wherein each opposite end of non-horizontal passage way 124 connects to cylinder block passage way 118 and gear cover passage way 120, respectively. In this example, the fluid can flow from cylinder block passage way 118 to gear cover passage way 120 under the action of gravity. Other suitable arrangements of passage way 116 are contemplated to suit different applications. Accordingly, passage way 116 of EI shaft 100 advantageously provides an auxiliary plumbing integration with cylinder block 18 and gear cover 16.

Figure 6:
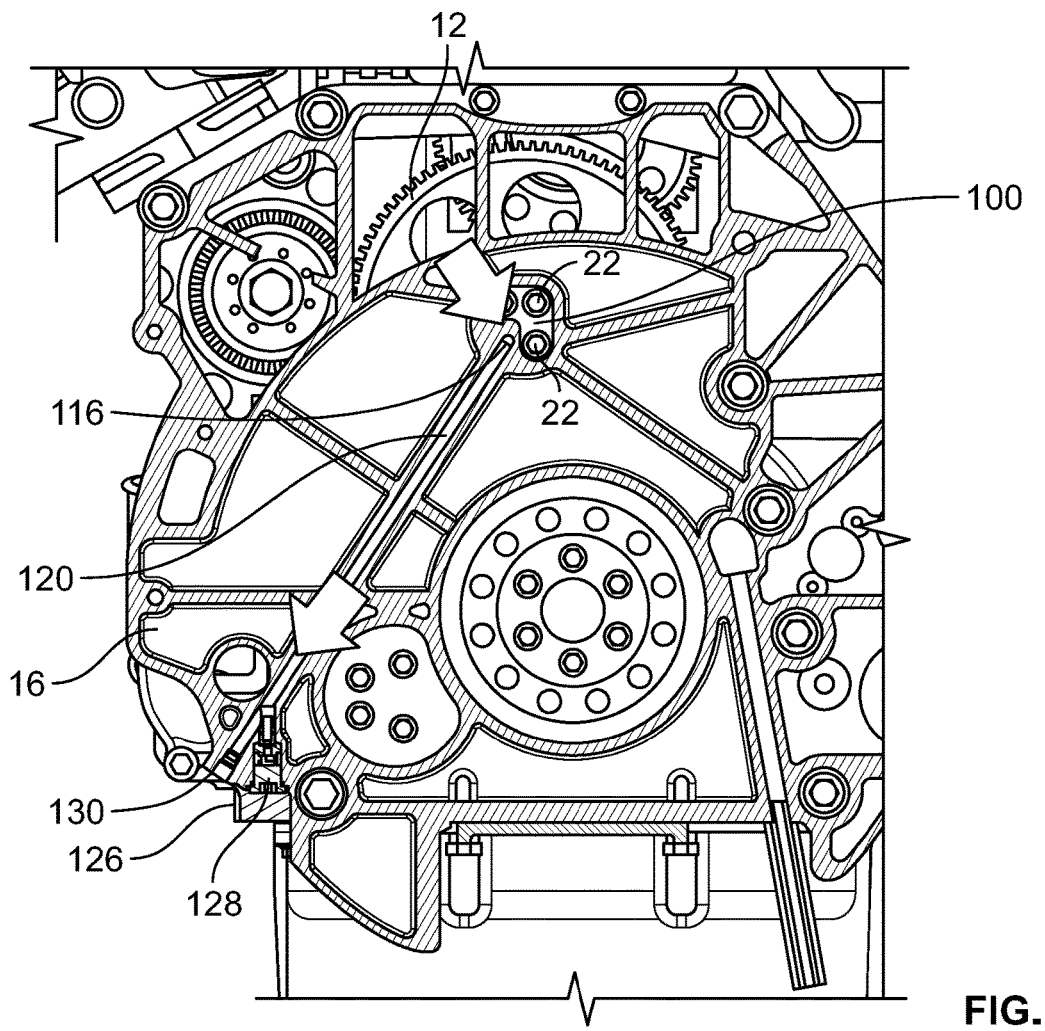
FIGS. 6 and 7 are partial vertical cross-sectional views of the engine gear train of FIG. 2 depicting a passage way connecting the enhanced idler shaft and the gear cover.
Figure 7:
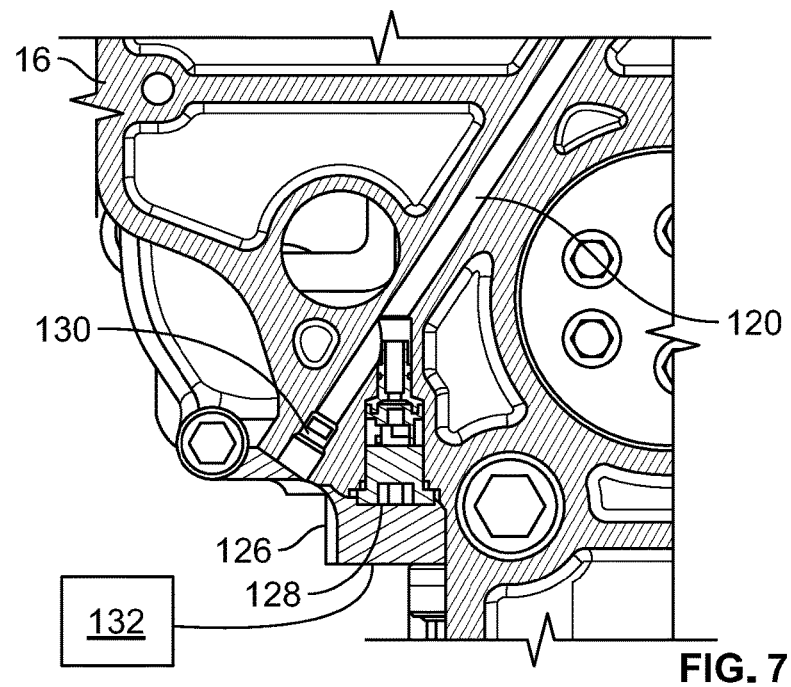

Referring now to FIGS. 6 and 7, in this configuration, it is advantageous that during the cold engine-start condition, passage way 116 delivers the fluid heated by cylinder block 18 and/or gear cover 16 to a common fluid sump 132 in which all the separated return fluid is mixed and from which the heated fluid can be supplied to other components of engine 10. In the illustrated embodiment, the fluid delivered to EI shaft 100 subsequently travels along gear cover passage way 120 under the action of gravity toward a bottom end 126 of gear cover 16 for performing the transmission operation. As shown in FIG. 7, a lower end of gear cover passage way 120 has a check valve (or one-way valve) mechanism 128 configured to allow the fluid to flow in only one direction at a predetermined pressure threshold. Also, the lower end of gear cover passage way 120 can have a plug 130 configured for stopping the fluid flow from gear cover passage way 120. In another example, the lower end of gear cover passage way 120 can be fluidly connect to another component of engine 10 (e.g., the common fluid sump 132). Other suitable arrangements of gear cover passage way 120 are contemplated to suit the application.

While the invention has been illustrated and described in detail in the drawings and foregoing description, the same is to be considered as illustrative and not restrictive in character, it being understood that only the preferred embodiments have been shown and described and that all changes and modifications that come within the scope of the inventions as defined in the claims are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary. For the avoidance of doubt, optional and/or preferred features as set out herein may be used either individually or in combination with each other where appropriate and particularly in the combinations as set out in the accompanying claims. The optional and/or preferred features for each aspect of the invention set out herein are also applicable to any other aspects of the invention, where appropriate.

What is claimed is:

1. An idler shaft used in an engine having a gear cover and a cylinder block, the idler shaft comprising: an integral body having a cylindrical shape, the idler shaft being compressed between the gear cover and the cylinder block when assembled together such that the integral body of the idler shaft provides a clamp load and axial sealing between the gear cover and the cylinder block; and a passage way fluidly connected to at least one of: the cylinder block and the gear cover for accommodating transmission of a fluid for the engine.

2. The idler shaft of claim 1, wherein the idler shaft includes a first side engaging an inner surface of the gear cover; and an opposite second side engaging an outer surface of the cylinder block, such that both the gear cover and the cylinder block are connected together by the idler shaft during operation of the engine.

3. The idler shaft of claim 2, wherein the idler shaft is gaplessly disposed between the gear cover and the cylinder block during use of the engine.

4. The idler shaft of claim 2, wherein the idler shaft is fastened to the gear cover and the cylinder block using at least one fastener.

5. The idler shaft of claim 4, wherein the idler shaft includes at least one throughbore configured to accommodate insertion of the at least one fastener.

6. The idler shaft of claim 4, wherein the at least one fastener simultaneously holds the cylinder block, the idler shaft, and the gear cover together.

7. An idler shaft used in an engine having a gear cover and a cylinder block, the idler shaft comprising: an integral body having an axial length greater than a total thickness of at least one gear supported by the idler shaft, the idler shaft being compressed between the gear cover and the cylinder block when assembled together such that the integral body of the idler shaft provides a clamp load and axial sealing between the gear cover and the cylinder block; and a passage way fluidly connected to at least one of: the cylinder block and the gear cover for accommodating transmission of a fluid for the engine.

8. The idler shaft of claim 7, wherein an axial length of the idler shaft is greater than eighty percent of a diameter of the idler shaft.

9. The idler shaft of claim 7, wherein the integral body of the idler shaft supports a compound gear.

10. The idler shaft of claim 7, wherein the integral body of the idler shaft has a cylindrical shape configured to be inserted into an opening of the at least one gear.

11. An idler shaft used in an engine having a gear cover and a cylinder block, the idler shaft comprising: an integral body having a cylindrical shape, the idler shaft being compressed between the gear cover and the cylinder block when assembled together such that the integral body of the idler shaft provides a clamp load and axial sealing between the gear cover and the cylinder block; and a passage way fluidly connected to at least one of: the cylinder block and the gear cover for accommodating transmission of a fluid for the engine and a delivery of the fluid to the idler shaft.

12. The idler shaft of claim 11, wherein the passage way of the idler shaft is fluidly connected to at least one of: a cylinder block passage way embedded in the cylinder block and a gear cover passage way embedded in the gear cover.

13. The idler shaft of claim 11, wherein the passage way of the idler shaft is fluidly connected to a breather associated with the engine.

14. The idler shaft of claim 11, wherein the passage way of the idler shaft is configured to prevent back flow of the fluid delivered to the idler shaft.

15. The idler shaft of claim 14, wherein the passage way includes a first passage way connected to the cylinder block.

16. The idler shaft of claim 15, wherein the passage way includes a second passage way connected to the first passage way at one end, and at an opposite end, connected to the gear cover.

17. The idler shaft of claim 16, wherein the first passage way is disposed higher than an uppermost portion of the second passage way.

18. The idler shaft of claim 11, wherein the passage way of the idler shaft is fluidly connected to a common fluid sump associated with the engine.

* * * * *